(12) United States Patent
Ackermann et al.

(10) Patent No.: US 10,018,116 B2
(45) Date of Patent: Jul. 10, 2018

(54) GAS TURBINE ENGINE BUFFER SYSTEM PROVIDING ZONED VENTILATION

(75) Inventors: William K. Ackermann, East Hartford, CT (US); Philip S. Stripinis, Rocky Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 13/366,450

(22) Filed: Feb. 6, 2012

(65) Prior Publication Data

US 2013/0192253 A1 Aug. 1, 2013

Related U.S. Application Data

(60) Provisional application No. 61/592,933, filed on Jan. 31, 2012.

(51) Int. Cl.
| | |
|---|---|
| *F02C 6/08* | (2006.01) |
| *F01D 5/08* | (2006.01) |
| *F01D 25/16* | (2006.01) |
| *F01D 25/18* | (2006.01) |
| *F02C 7/18* | (2006.01) |

(52) U.S. Cl.
CPC ............... *F02C 6/08* (2013.01); *F01D 5/082* (2013.01); *F01D 5/085* (2013.01); *F01D 25/16* (2013.01); *F01D 25/183* (2013.01); *F02C 7/185* (2013.01); *F05D 2260/209* (2013.01); *F05D 2260/213* (2013.01); *F05D 2260/4031* (2013.01); *Y02T 50/676* (2013.01)

(58) Field of Classification Search
CPC . F02C 6/08; F01D 5/082; F01D 5/085; F01D 25/16; F05D 2260/209; F05D 2260/213
USPC .............. 60/782, 784, 785, 805, 806, 39.83; 415/116, 175, 180
See application file for complete search history.

(56) References Cited

U.S. PATENT DOCUMENTS

| | | | |
|---|---|---|---|
| 2,584,899 A | 2/1952 | McLeod | |
| 2,636,665 A * | 4/1953 | Lombard | ...................... 417/368 |
| 3,287,906 A | 11/1966 | McCormick | |
| 3,623,736 A * | 11/1971 | Petrie et al. | .................. 277/422 |
| 3,747,343 A * | 7/1973 | Rosen | .......................... 60/226.1 |
| 3,844,110 A * | 10/1974 | Widlansky et al. | ......... 60/39.08 |
| 3,925,979 A | 12/1975 | Ziegler | |

(Continued)

FOREIGN PATENT DOCUMENTS

| | | |
|---|---|---|
| GB | 1386481 | 3/1975 |
| GB | 1516041 | 6/1978 |

(Continued)

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

(Continued)

*Primary Examiner* — Carlos A Rivera
(74) *Attorney, Agent, or Firm* — Carlson, Gaskey & Olds (57) ABSTRACT

A gas turbine engine includes a first zone and a second zone downstream from the first zone. A buffer system can communicate a buffer cooling air to at least the first zone. A bleed source can communicate a bleed air to the second zone.

10 Claims, 5 Drawing Sheets

(56) References Cited

U.S. PATENT DOCUMENTS

| | | | | |
|---|---|---|---|---|
| 3,940,092 | A | | 2/1976 | Farris |
| 4,497,172 | A | | 2/1985 | Smith |
| 4,502,274 | A | | 3/1985 | Girault |
| 4,546,605 | A | * | 10/1985 | Mortimer et al. ............ 60/226.1 |
| 4,574,584 | A | | 3/1986 | Hovan |
| 4,576,547 | A | * | 3/1986 | Weiner et al. ................ 415/116 |
| 4,653,267 | A | | 3/1987 | Brodell et al. |
| 4,709,545 | A | | 12/1987 | Stevens et al. |
| 4,782,658 | A | | 11/1988 | Perry |
| 4,863,354 | A | | 9/1989 | Asselin et al. |
| 5,072,781 | A | | 12/1991 | Goodman |
| 5,134,844 | A | * | 8/1992 | Lee et al. ........................ 60/806 |
| 5,305,616 | A | * | 4/1994 | Coffinberry .................... 62/402 |
| 5,311,734 | A | | 5/1994 | Pope et al. |
| 5,472,313 | A | | 12/1995 | Quinones et al. |
| 5,482,431 | A | | 1/1996 | Taylor |
| 5,573,378 | A | | 11/1996 | Barcza |
| 5,685,158 | A | | 11/1997 | Lenahan et al. |
| 5,915,917 | A | | 6/1999 | Eveker et al. |
| 6,035,627 | A | | 3/2000 | Liu |
| 6,334,755 | B1 | * | 1/2002 | Coudray et al. .............. 415/115 |
| 6,516,618 | B1 | | 2/2003 | Bock |
| 6,520,742 | B1 | | 2/2003 | Forrester et al. |
| 6,550,253 | B2 | | 4/2003 | Mortzheim et al. |
| 6,732,502 | B2 | | 5/2004 | Seda et al. |
| 7,090,466 | B2 | | 8/2006 | Honkomp et al. |
| 7,147,440 | B2 | | 12/2006 | Benjamin et al. |
| 7,159,402 | B2 | * | 1/2007 | Hein et al. ....................... 60/785 |
| 7,287,384 | B2 | | 10/2007 | Fish et al. |
| 7,309,210 | B2 | * | 12/2007 | Suciu et al. ............... 415/174.2 |
| 7,377,098 | B2 | | 5/2008 | Walker et al. |
| 7,448,221 | B2 | * | 11/2008 | Suciu et al. ..................... 60/805 |
| 7,658,077 | B2 | | 2/2010 | Earith et al. |
| 8,061,657 | B2 | | 11/2011 | Rocklin et al. |
| 2007/0220899 | A1 | | 9/2007 | Earth Thomas et al. |
| 2008/0115503 | A1 | | 5/2008 | Vasquez et al. |
| 2009/0097967 | A1 | | 4/2009 | Smith et al. |
| 2009/0104020 | A1 | * | 4/2009 | Roush et al. .................. 415/145 |
| 2010/0092116 | A1 | | 4/2010 | Franconi |
| 2010/0148396 | A1 | | 6/2010 | Xie et al. |
| 2010/0162683 | A1 | | 7/2010 | Grabowski et al. |
| 2010/0164234 | A1 | | 7/2010 | Bowman et al. |
| 2010/0170262 | A1 | | 7/2010 | Kaslusky et al. |
| 2010/0236216 | A1 | * | 9/2010 | Winter et al. ................... 60/204 |
| 2010/0331139 | A1 | | 12/2010 | McCune |
| 2011/0047959 | A1 | | 3/2011 | DiBendetto |
| 2011/0150634 | A1 | * | 6/2011 | Bajusz et al. ................. 415/145 |
| 2013/0202403 | A1 | | 8/2013 | Morin et al. |

FOREIGN PATENT DOCUMENTS

| | | |
|---|---|---|
| GB | 2041090 | 9/1980 |
| WO | 2007038674 | 4/2007 |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Kiley & Sons, Inc. New York: New York. pp. 1-30, 50-1, 56-8, 60-1, 64-71, 87-9, 324-9, 436-7.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.nmsonline.com/articles/composite-fan-blade-containment-case pp. 1-4.

Hall, C.A. and Crichton, D. (2007). Engine design studies for a silent aircraft. Journal of Turbomachinery, 129, 179-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Kie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Dates, &C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Nendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

(56) References Cited

OTHER PUBLICATIONS

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

European Search Report for Application No. 13775763.9 dated Aug. 26, 2015.

Aero-Engine Design: From State of the Art Turbofans Towards Innovative Architectures, Mar. 3-7, 2008; von Karman Institute for Fluid Dynamics, Chaussee de Waterloo, 72, B-1640 Rhode Saint Genese Belgium; Lecture Series 2008-03; ISN0377-8312; 26 pages.

Dr. Gunter Wilfert, MTU Aero Engines, Germany; Geared Fan; XP003035510; 76 pages.

Crichton, et al.; Design and Operation for Ultra Low Noise Take-Off; 45th AIAA Aerospace Sciences Meeting and Exhibit; Jan. 8-11, 2007, Reno, Nevada; AIAA 2007-456; 18 pages.

Malzacher, et al.; Aerodesign and Testing of an Aeromechanically Highly Loaded LP Turbine; Journal of Turbomachinery, Oct. 2006, vol. 128, pp. 643-649; http://turbomachinery.asmedigitalcollection.asme.org.

Wilfert, et al.; Clean-Validation of a High Efficient Low NOx Core, a GTF High Speed Turbine and an Integration of a Recuperator in an Environment Friendly Engine Concept; 41st AIAA/ASME/SAE/ASEE Joint Propulsion Conference & Exhibit, Jul. 10-13, 2005, Tuscon Arizona; AIAA 2005-4195; pp. 1-11.

Wilfert, et al.; Clean-Validation of a GTF High Speed Turbine and Integration of Heat Exchanger Technology in an Environmental Friendly Engine Concept; ISABE-2005-1156; pp. 1-8.

Riegler, et al.; The Geared Turbofan Technology—Opportunities, Challenges and Readiness Status; 10 pages.

International Search Report and Written Opinion of the International Searching Authority for International Application No. PCT/US13/21634 dated Aug. 16, 2013.

\* cited by examiner

GAS TURBINE ENGINE BUFFER SYSTEM PROVIDING ZONED VENTILATION

CROSS-REFERENCE TO RELATED APPLICATIONS

This application claims priority to U.S. Provisional Application No. 61/592,933 which was filed on Jan. 31, 2012.

BACKGROUND

This disclosure relates to a gas turbine engine, and more particularly to a buffer system that can provide multi-zone ventilation of gas turbine engine hardware.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine modes.

Gas turbine engines typically include shafts that support a plurality of airfoil supporting rotors of the compressor section and the turbine section. The rotors include disks having a rim, a bore and a web that extends between the rim and the bore. Compressor rotor bores are typically thermally conditioned to provide desirable rotor/case clearances. Rotor cooling is also desirable because of the relatively high temperatures experienced during gas turbine engine operation.

SUMMARY

A gas turbine engine includes a first zone and a second zone downstream from the first zone. A buffer system can communicate a buffer cooling air to at least the first zone. A bleed source can communicate a bleed air to at least the second zone.

In a further embodiment of the foregoing gas turbine engine embodiment, the section is one of a compressor section and a turbine section of the gas turbine engine.

In a further embodiment of either of the foregoing gas turbine engine embodiments, the buffer cooling air cools a first plurality of disks associated with the first zone of a compressor section of the gas turbine engine.

In a further embodiment of any of the foregoing gas turbine engine embodiments, the bleed air can cool a second plurality of disks associated with the second zone.

In a further embodiment of any of the foregoing gas turbine engine embodiments, the buffer system can include a first bleed air supply and a conditioning device that conditions the first bleed air supply to render the buffer cooling air.

In a further embodiment of any of the foregoing gas turbine engine embodiments, anti-vortex tubing can be mounted within a cavity of the second zone.

In a further embodiment of any of the foregoing gas turbine engine embodiments, the bleed air is a different source of air than the buffer cooling air.

In a further embodiment of any of the foregoing gas turbine engine embodiments, the buffer system can include a first bleed air supply, a second bleed air supply and a valve that selects between the first bleed air supply and the second bleed air supply to communicate the buffer cooling air to the first zone.

In a further embodiment of any of the foregoing gas turbine engine embodiments, the buffer system can include a controller that selectively commands communication of said buffer cooling air to said first zone.

In a further embodiment of any of the foregoing gas turbine engine embodiments, the gas turbine engine can include a high bypass geared aircraft engine having a bypass ratio of greater than about six (6).

In a further embodiment of any of the foregoing gas turbine engine embodiments, the gas turbine engine includes a low fan pressure ratio of less than about 1.45.

In a further embodiment of any of the foregoing gas turbine engine embodiments, the gas turbine engine includes a seal that divides a section of the gas turbine engine into the first zone and the second zone.

In another exemplary embodiment, a gas turbine engine includes a compressor section, a combustor in fluid communication with the compressor section, a turbine section in fluid communication with the combustor, at least one shaft that interconnects the portion of the compressor section and the turbine section, and a bearing structure that supports the at least one shaft. The bearing structure defines a bearing compartment. A seal positioned to divide the compressor section into a first zone and a second zone. A buffer system can communicate a buffer cooling air to the bearing structure and to at least the first zone.

In a further embodiment of the foregoing gas turbine engine embodiment, the buffer system can include a first bleed air supply and a conditioning device that conditions the first bleed air supply to render the buffer cooling air.

In a further embodiment of either of the foregoing gas turbine engine embodiments, a bleed source can communicate a bleed air to ventilate the second zone.

In yet another exemplary embodiment, a method of cooling a portion of a gas turbine engine can include dividing the section of the gas turbine engine into a first zone and a second zone. A buffer cooling air is communicated to the first zone. A bleed air is communicated to the second zone.

In a further embodiment of the foregoing method embodiment, the step of dividing the section includes dividing a compressor section of the gas turbine engine into the first zone and the second zone.

In a further embodiment of any of the foregoing method embodiments, a bleed air supply is cooled prior to communicating the buffer cooling air.

In a further embodiment of any of the foregoing method embodiments, the step of communicating the bleed airflow includes sourcing the bleed airflow from a core airflow.

In a further embodiment of any of the foregoing method embodiments, a seal does the dividing.

The various features and advantages of this disclosure will become apparent to those skilled in the art from the following detailed description. The drawings that accompany the detailed description can be briefly described as follows.

DETAILED DESCRIPTION

Figure 1:
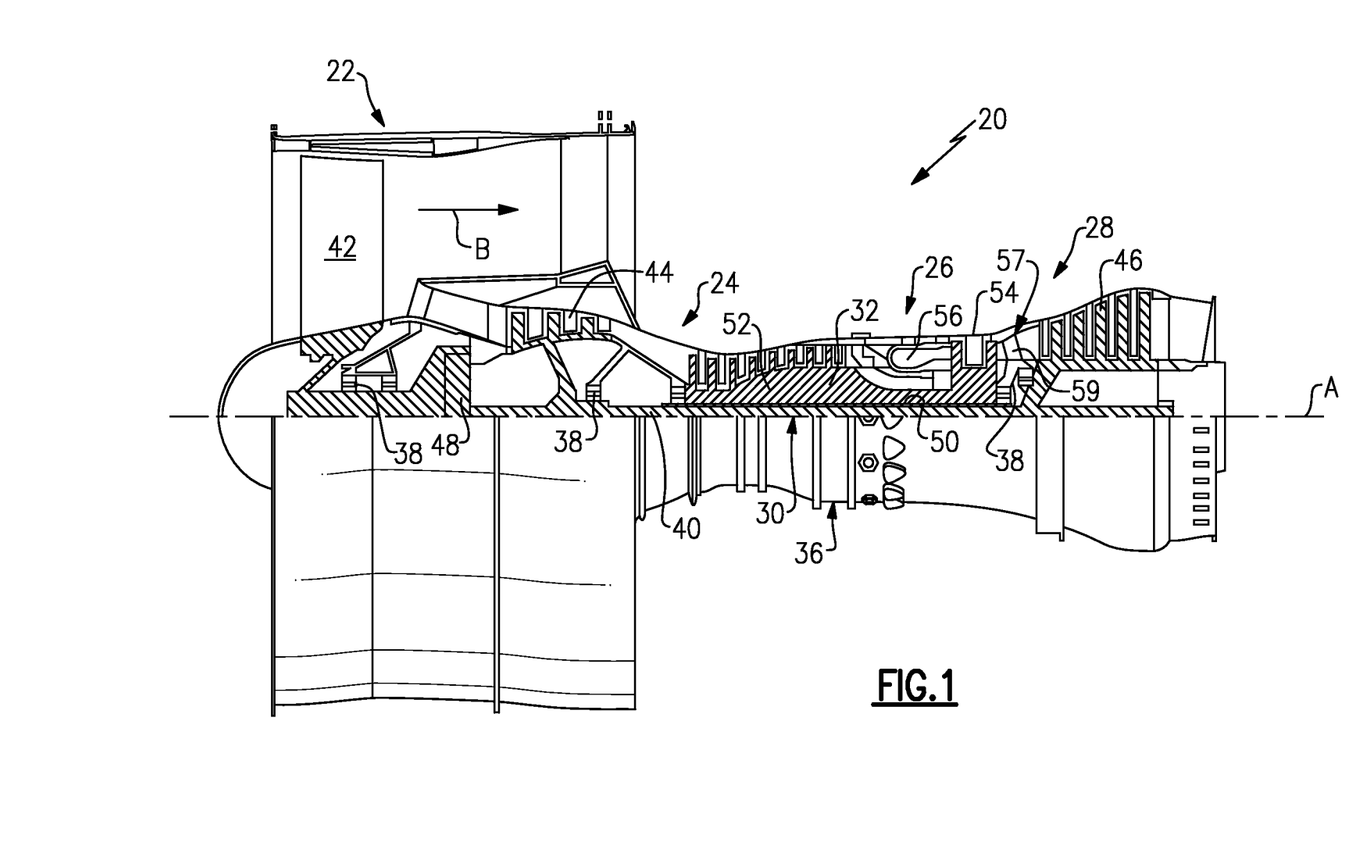
FIG. 1 is a cross-section of a gas turbine engine.

FIG. 1 is a cross-section of a gas turbine engine 20. The gas turbine engine 20 of the exemplary embodiment is a two-spool turbofan engine that generally incorporates a fan section 22, a compressor section 24, a combustor section 26 and a turbine section 28. Alternative engines might include an augmenter section (not shown) among other systems or features. The fan section 22 drives air along a bypass flow path while the compressor section 24 drives air along a core flow path for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of turbine engines, including but not limited to three-spool engine architectures and land based applications.

The gas turbine engine 20 generally includes a low speed spool 30 and a high speed spool 32 mounted for rotation about an engine centerline longitudinal axis A relative to an engine static structure 36 via several bearing structures 38. It should be understood that various bearing structures 38 at various locations may alternatively or additionally be provided.

The low speed spool 30 generally includes an inner shaft 40 (i.e., a low shaft) that interconnects a fan 42, a low pressure compressor 44 and a low pressure turbine 46. The inner shaft 40 can be connected to the fan 42 through a geared architecture 48 to drive the fan 42 at a lower speed than the low speed spool 30. The high speed spool 32 includes an outer shaft 50 (i.e., a high shaft) that interconnects a high pressure compressor 52 and a high pressure turbine 54. In this example, the inner shaft 40 and the outer shaft 50 are supported at a plurality of axial locations by bearing structures 38 that are positioned within the engine static structure 36.

A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 can support one or more bearing structures 38 in the turbine section 28. The inner shaft 40 and the outer shaft 50 are concentric and rotate via the bearing structures 38 about the engine centerline longitudinal axis A, which is collinear with their longitudinal axes. The inner shaft 40 and the outer shaft 50 can be either co-rotating or counter-rotating with respect to one another.

The core airflow is compressed by the low pressure compressor 44 and the high pressure compressor 52, is mixed with fuel and burned in the combustor 56, and is then expanded over the high pressure turbine 54 and the low pressure turbine 46. The mid-turbine frame 57 includes airfoils 59 which are in the core airflow path. The high pressure turbine 54 and the low pressure turbine 46 rotationally drive the respective low speed spool 30 and the high speed spool 32 in response to the expansion.

In some non-limiting examples, the gas turbine engine 20 is a high-bypass geared aircraft engine. In a further example, the gas turbine engine 20 bypass ratio is greater than about six (6:1). The geared architecture 48 of the example gas turbine engine 20 includes an epicyclic gear train, such as a planetary gear system or other gear system. The example epicyclic gear train has a gear reduction ratio of greater than about 2.3. The geared architecture 48 enables operation of the low speed spool 30 at higher speeds which can increase the operational efficiency of the low pressure compressor 44 and low pressure turbine 46 and render increased pressure in a fewer number of stages.

The low pressure turbine 46 pressure ratio is pressure measured prior to inlet of low pressure turbine 46 as related to the pressure at the outlet of the low pressure turbine 46 of the gas turbine engine 20. In another non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about 5 (5:1). The geared architecture 48 of yet another embodiment is an epicyclic gear train with a gear reduction ratio of greater than about 2.5:1. It should be understood, however, that the above parameters are only exemplary of one embodiment of a geared architecture engine and that the present disclosure is applicable to other gas turbine engines including direct drive turbofans.

In this embodiment of the example gas turbine engine 20, a significant amount of thrust is provided by a bypass flow B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise. TSFC (Thrust Specific Fuel Consumption) is an industry standard parameter of fuel consumption per unit of thrust.

Fan Pressure Ratio is the pressure ratio across the fan section 22 without the use of a Fan Exit Guide Vane system. The low Fan Pressure Ratio according to one non-limiting embodiment of the example gas turbine engine 20 is less than 1.45.

Low Corrected Fan Tip Speed is the actual fan tip speed divided by an industry standard temperature correction of "$T$"/$518.7^{0.5}$. T represents the ambient temperature in degrees Rankine. The Low Corrected Fan Tip Speed according to one non-limiting embodiment of the example gas turbine engine 20 is less than about 1150 fps (351 m/s).

Figure 2:
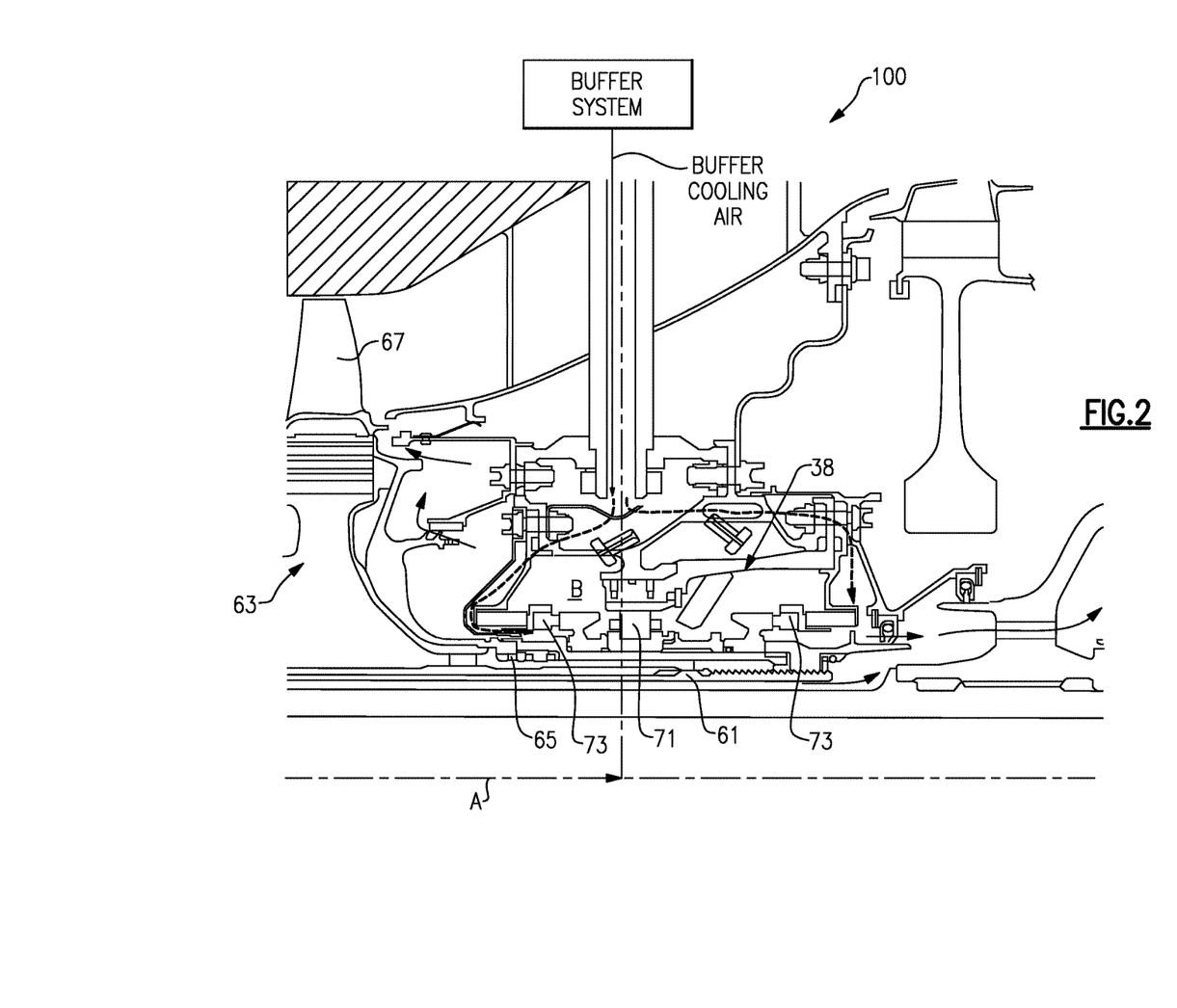
FIG. 2 is a cross-section of a portion of the gas turbine engine.

FIG. 2 illustrates a portion 100 of a gas turbine engine, such as the gas turbine engine 20. The portion 100 can include one or more bearing structures 38. Only one bearing structure 38 is depicted in FIG. 2 to schematically illustrate its features, but this is in no way intended to limit this disclosure.

The bearing structure 38 supports a shaft 61, such as the outer shaft 50, which supports a rotor assembly 63, such as a rotor assembly of the compressor section 24 or the turbine section 28, through a hub 65. In this example, the shaft 61 is a tie shaft that interconnects the high pressure compressor 52 and the high pressure turbine 54. The rotor assembly 63 carries at least one airfoil 67 for adding or extracting energy from the core airflow.

The bearing structure 38 defines a bearing compartment B that houses one or more bearings 71. The bearing compartment B contains a lubricant for lubricating (and acting as a cooling medium to) the bearings 71. One or more seals 73 contain the lubricant within the bearing compartment B. The seals 73 of the bearing compartment B must be pressurized to prevent the lubricant from leaking out during certain flight conditions, including both steady-state and transient conditions. A buffer system can be used to communicate a buffer cooling air to the bearing compartment B in order to provide adequate pressurization of the seals 73 without exceeding material and/or lubricant temperature limitations. Example buffer systems that can be used for this and other purposes, including ventilating rotor assemblies, are detailed below.

Figure 3:
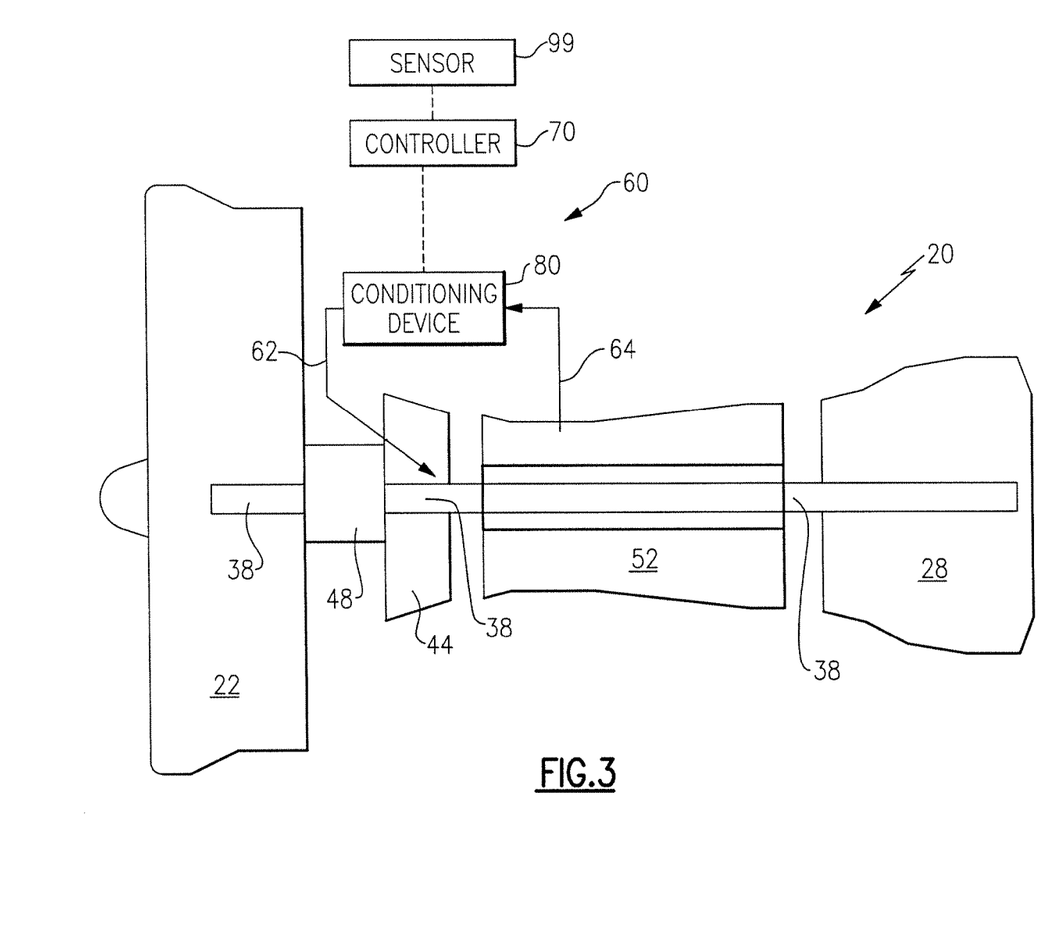
FIG. 3 is a schematic of an embodiment of a buffer system of the gas turbine engine.

FIG. 3 illustrates an example buffer system 60 that can communicate a buffer cooling air 62 throughout the gas turbine engine 20. For example, the buffer cooling air 62 can be used to pressurize the outside of the bearing compartments of one or more bearing structures 38 to maintain a sufficient pressure differential between the buffer cavity and the bearing compartment and maintain bearing compartment seal leakage inflow at an acceptable temperature. The buffer cooling air 62 can also be used to provide multi-zone ventilation (i.e., conditioning/cooling) of the compressor section 24 or the turbine section 28 of the gas turbine engine 20, as discussed in greater detail below.

The buffer system 60 can include a bleed air supply 64 and a conditioning device 80. The bleed air supply 64 can be sourced from the fan section 22, the low pressure compressor 44 or the high pressure compressor 52. In the illustrated non-limiting example, the bleed air supply 64 is sourced from a middle stage of the high pressure compressor 52. Although shown schematically, a passageway, duct or conduit can extend between the source and the conditioning device 80 for communicating the bleed air supply 64.

The conditioning device 80 can condition (i.e., cool) the bleed air supply 64 to render a buffer cooling air 62 having a temperature that is acceptable to buffer portions of the gas turbine engine 20. The conditioning device 80 could include an air-to-air heat exchanger, a fuel-to-air heat exchanger, or any other suitable heater exchanger.

Figure 4:
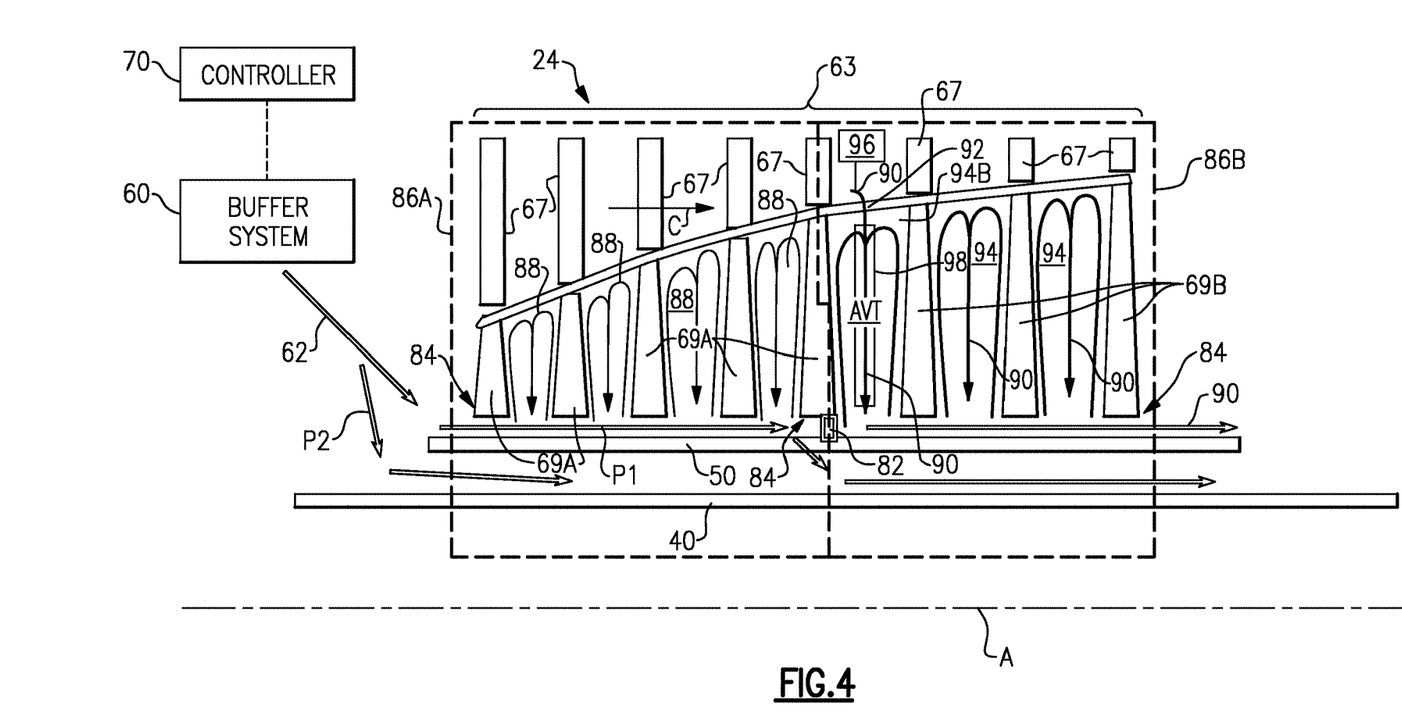
FIG. 4 is a schematic illustrating potential ventilation aspects of the buffer system of FIG. 3.

FIG. 4 schematically illustrates a portion of the compressor section 24 of the gas turbine engine 20 that can be ventilated in multiple zones by the exemplary buffer system 60. Although the various features of the buffer system 60 are illustrated with respect to the compressor section 24, the buffer system 60 could also be incorporated into other portions of the gas turbine engine 20, including the turbine section 28.

The exemplary compressor section 24 includes a rotor assembly 63 having a plurality of disks 69A, 69B. The disks 69A, 69B carry a plurality of airfoils 67 that rotate about the engine longitudinal centerline axis A to either add or extract energy from the core airflow C that is communicated along a core flow path of the gas turbine engine 20. The disks 69A, 69B of the rotor assembly 63 are held in compression relative to one another by the outer shaft 50, which is a tie shaft in this example. The inner shaft 40 is concentric to and located radially inward from the outer shaft 50 and interconnects the low pressure compressor 44 and the low pressure turbine 46 (See FIG. 1).

In the exemplary embodiment, at least one seal 82 is radially positioned between a bore 84 of at least one of the disks 69A, 69B and the outer shaft 50 to divide the compressor section 24 into a first zone 86A and a second zone 86B that is downstream from the first zone 86A. In this example, the seal 82 is a disk bore seal or other suitable sealing mechanism that is positioned radially inward of one of the bores 84 and circumferentially extends about the engine longitudinal centerline axis A. Although a single seal 82 is illustrated, it should be understood that a plurality of seals 82 could be implemented to divide a portion of the gas turbine engine 20 into multiple zones for individually conditioning each zone with airflow of an appropriate temperature for cooling each individual zone. The actual positioning of the seal(s) 82 will vary depending on the thermal conditions and cooling requirements of the gas turbine engine 20 hardware.

The buffer system 60 can communicate a buffer cooling air 62 to ventilate a first plurality of disks 69A positioned within the first zone 86A. A first portion P1 of the buffer cooling air 62 can be communicated between the outer shaft 50 and the bores 84 of the first plurality of disks 69A. The portion P1 can be circulated through cavities 88 that are axially disposed between adjacent disks of the first plurality of disks 69A to adequately cool the first plurality of disks 69A during engine operation. The seal 82 stops the buffer cooling air 62 from entering the second zone 86B. The buffer cooling air 62 can exit the cavities 88 through a portion of the outer shaft 50.

A second portion P2 of the buffer cooling air 62 can optionally be communicated between the outer shaft 50 and the inner shaft 40 for buffering the shafts themselves and downstream hardware of the gas turbine engine 20. In this manner, the upstream, relatively cooler, first zone 86A of the compressor section 24 is buffered with buffer cooling air 62 that is thermally matched to the thermal capabilities of its hardware and the local compressor flowpath.

The second zone 86B may be ventilated with a different source of air than the first zone 86A. For example, a bleed air 90 that is bled from a bleed source 96 (shown schematically) can be communicated in a radially inward direction to ventilate a second plurality of disks 69B of the second zone 86B. In one example, the bleed air 90 is sourced from the core airflow C. The bleed air 90 is communicated through a port 92 that can include a passageway that extends into one of a plurality of cavities 94 that are axially disposed between adjacent disks of the second plurality of disks 69B. In this example, the port 92 is in fluid communication with an upstream most cavity 94B of the second zone 86B. The bleed air 90 is circulated through the cavities 94 and axially downstream between the bores 84 and the outer shaft 50 to ventilate the second plurality of disks 69B of the second zone 86B. In this manner, the downstream, relatively hotter second zone 86B is buffered with a bleed air 90 having a greater temperature than the buffer cooling air 62.

Tubing 98 can be positioned within one or more of the cavities 94. In the exemplary embodiment, the tubing 98 is in fluid communication with the port 92 and is mounted within the upstream most cavity 94B of the second zone 86B. The tubing 98 can be an anti-vortex tube or other suitable tubing that can generate solid-body rotational flow. The pressure differential between the compressor flowpath bleed source and the ultimate sink draws the bleed air 90 in the radially inward direction toward the bores 84 through the tubing 98 and in doing so minimizes the associated pressure loss relative to the absence of the turbine 98.

As illustrated in the FIG. 3 and FIG. 4 embodiment, the buffer system 60 could include a controller 70. The controller 70 is programmed to command the communication of the buffer cooling air 62 to the bearing structures 38 and to provide the multi-zone ventilation depicted by FIG. 4 in response to detecting a flight condition of the gas turbine engine 20. The buffer system 60 is operable to communicate buffer cooling air 162 for responding to any engine operating condition. The controller 70 could also generate a signal to command operation of the conditioning device 80 for controlling the temperature of the buffer cooling air 62 for different flight conditions (See FIG. 3).

The buffer system 60 can further include a sensor 99 for detecting flight conditions of the gas turbine engine 20. The sensor 99 and the controller 70 can be programmed to detect any flight condition. The sensor 99 can also be replaced by any control associated with the gas turbine engine 20 or an associated aircraft. Also, although shown as a separate feature, the controller functionality could be incorporated into another portion of the buffer system 60, such as the conditioning device 80.

Figure 5:
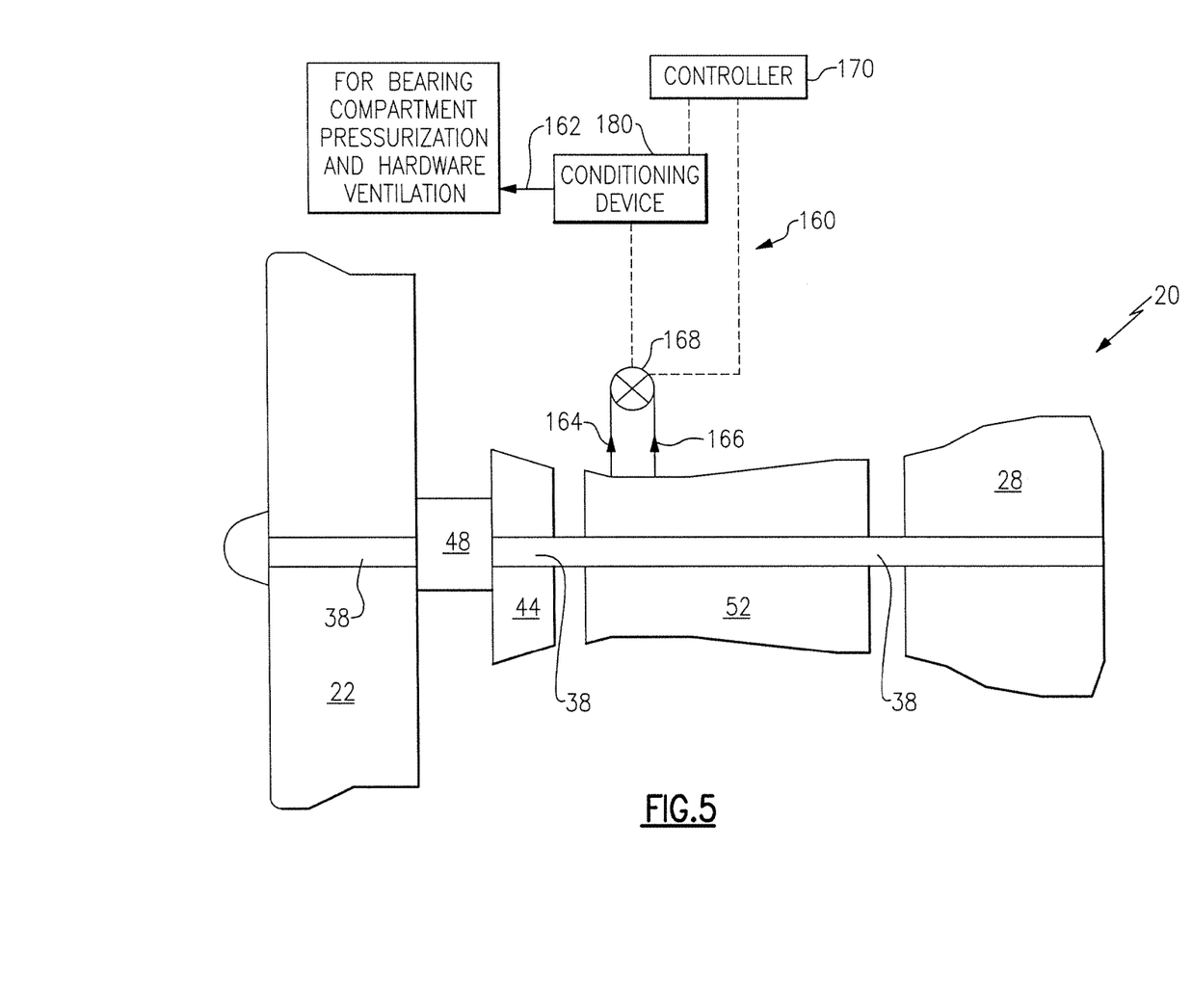
FIG. 5 illustrates another embodiment of a buffer system.

FIG. 5 illustrates another embodiment of a buffer system 160 that can be incorporated into a gas turbine engine to pressurize bearing compartments and ventilate other engine hardware. In this disclosure, like reference numerals indicate similar features, whereas reference numerals with an added prefix numeral of "1" indicate slightly modified features. The buffer system 160 is similar to the buffer system 60 detailed above except, in this example, the buffer system 160 is a multi-source buffer system that includes a second bleed air supply 166 in addition to a first bleed air supply 164. In the exemplary embodiment, the first bleed air supply 164 is a low pressure bleed air supply and the second bleed air supply 166 is a high pressure bleed air supply that includes a pressure that is greater than the pressure of the first bleed air supply 164. The buffer system 160 could also embody a two-zone, multi-source system that separately addresses low and high pressure requirements.

The first bleed air supply 164 can be sourced from the fan section 22, the low pressure compressor 44 or the high pressure compressor 52. In the illustrated non-limiting example, the first bleed air supply 164 is sourced from an upstream stage of the high pressure compressor 52. However, the first bleed air supply 164 could be sourced from any location that is upstream from the second bleed air supply 166. The second bleed air supply 166 can be sourced from the high pressure compressor 52, such as from a middle or downstream stage of the high pressure compressor 52. The second bleed air supply 166 could also be sourced from the low pressure compressor 44 or the fan section 22 depending on where the first bleed air supply 164 is sourced from.

The buffer system 160 can also include a valve 168 that is in communication with both the first bleed air supply 164 and the second bleed air supply 166. Although shown schematically, the first bleed air supply 164 and the second bleed air supply 166 can be in fluid communication with the valve 168 via buffer tubing, conduits, or other passageways. Check valves can also be used to prevent the second bleed air supply 164 from backflowing into the first bleed air supply 166.

The valve 168 can select between the first bleed air supply 164 and the second bleed air supply 166 to communicate a buffer cooling air 162 having a desired temperature and pressure to portions of the gas turbine engine 20. The valve 168 communicates either the first bleed air supply 164 or the second bleed air supply 166 to a conditioning device 180 to cool the air supply and render the buffer cooling air 162.

The valve 168 can be a passive valve or a controller base valve. A passive valve operates like a pressure regulator that can switch between two or more sources without being commanded to do so by a controller, such as an engine control (EEC). The valve 168 of this example uses only a single input which is directly measured to switch between the first bleed air supply 164 and the second bleed air supply 166.

The valve 168 could also be a controller based valve. For example, the buffer system 160 could include a controller 170 in communication with the valve 168 for selecting between the first bleed air supply 164 and the second bleed air supply 166. The controller 170 is programmed with the necessary logic for selecting between the first bleed air supply 164 and the second bleed air supply 166 in response to detecting a pre-defined power condition of the gas turbine engine 20. The controller 170 could also be programmed with multiple inputs.

The determination of whether to communicate the first bleed air supply 164 or the second bleed air supply 166 as the buffer cooling air 162 is based on a power condition of the gas turbine engine 20. The term "power condition" as used in this disclosure generally refers to an operability condition of the gas turbine engine 20. Gas turbine engine power conditions can include low power conditions and high power conditions. Example low power conditions include, but are not limited to, ground operation, ground idle and descent idle. Example high power conditions include, but are not limited to, takeoff, climb, and cruise conditions. It should be understood that other power conditions are also contemplated as within the scope of this disclosure.

In one exemplary embodiment, the valve 168 communicates the first bleed air supply 164 (which is a relatively lower pressure bleed air supply) to the conditioning device 180 in response to identifying a high power condition of a gas turbine engine 20. The second bleed air supply 166 (which is a relatively higher pressure bleed air supply) is selected by the valve 168 and communicated to the conditioning device 180 in response to detecting a low power condition of the gas turbine engine 20. Both sources of bleed air are intended to maintain the same minimum pressure delta across the bearing compartment seals. Low power conditions require a relatively higher stage pressure source to maintain adequate pressure differential, while high power conditions can meet requirements with a relatively lower stage pressure source. Use of the lowest possible compressor stage can to meet the pressure requirements and minimize supply temperature and any negative performance impact to the gas turbine engine 20.

The conditioning device 180 of the buffer system 160 could include a heat exchanger or an ejector. An ejector adds pressure (using a small amount of the second bleed air supply 166) to the first bleed air supply 164 to prepare the buffer supply air 162.

Although the different examples have a specific component shown in the illustrations, embodiments of this disclosure are not limited to those particular combinations. It is possible to use some of the components or features from one of the examples in combination with features or components from another one of the examples.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
    a compressor section;
    a combustor in fluid communication with said compressor section;
    a turbine section in fluid communication with said combustor;
    an inner shaft that interconnects a first portion of said compressor section and a first portion of said turbine section;
    an outer shaft that interconnects a second portion of said compressor section and a second portion of said turbine section;
    a bearing structure that supports said inner shaft and said outer shaft, wherein said bearing structure defines a bearing compartment;

a disk bore seal that divides said compressor section into a first zone and a second zone, said disk bore seal positioned between a bore of a disk of said compressor section and said outer shaft;

a buffer system including a heat exchanger or an ejector configured to condition a bleed air supply and communicate a buffer cooling air to said bearing structure and to said first zone, wherein a first portion of said buffer cooling air is communicated within said first zone at a location radially outward of said outer shaft to ventilate said disk and a second portion of said buffer cooling air is communicated between said outer shaft and said inner shaft, and wherein said disk bore seal blocks said first portion of said buffer cooling air from entering said second zone but does not block said second portion of said buffer cooling air from being communicated between said outer shaft and said inner shaft;

a bleed source located within said second zone and configured to communicate a bleed air to ventilate said second zone;

a port configured to receive said bleed air from said bleed source and communicate said bleed air into said second zone; and an anti-vortex tube in fluid communication with said port and configured to direct the bleed air radially inwardly toward said outer shaft.

2. The gas turbine engine as recited in claim 1, wherein said buffer system includes a first bleed air supply, a second bleed air supply, and a valve configured to select between said first bleed air supply and said second bleed air supply to communicate said buffer cooling air to said first zone.

3. The gas turbine engine as recited in claim 2, wherein said first bleed air supply is communicated as said buffer cooling air in response to high power conditions of the gas turbine engine and said second bleed air supply is communicated as said buffer cooling air in response to low power conditions of the gas turbine engine.

4. The gas turbine engine as recited in claim 3, wherein said high power conditions include takeoff, climb, and cruise conditions of the gas turbine engine.

5. The gas turbine engine as recited in claim 3, wherein said low power conditions include ground operation, ground idle, and descent idle conditions of the gas turbine engine.

6. The gas turbine engine as recited in claim 1, comprising a controller programmed to command the actuation of said buffer cooling air in response to detecting a flight condition of the gas turbine engine.

7. The gas turbine engine as recited in claim 6, comprising a sensor configured to detect said flight condition.

8. The gas turbine engine as recited in claim 6, wherein said controller is configured to generate a signal to command operation of said heat exchanger or said ejector in response to detecting said flight condition.

9. The gas turbine engine as recited in claim 1, wherein said bleed air is a different source of air than said buffer cooling air.

10. The gas turbine engine as recited in claim 1, wherein the gas turbine engine is a high bypass geared aircraft engine that includes a fan and a geared architecture, wherein the geared architecture is configured to control the fan at lower speeds than said inner shaft.

* * * * *